(12) United States Patent
Yang et al.

(10) Patent No.: US 10,599,263 B2
(45) Date of Patent: Mar. 24, 2020

(54) IN-CELL TOUCH DISPLAY PANEL AND TOUCH DISPLAY SYSTEM

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Ming Yang, Beijing (CN); Xue Dong, Beijing (CN); Xiaochuan Chen, Beijing (CN); Peng Liu, Beijing (CN); Qian Wang, Beijing (CN); Pengcheng Lu, Beijing (CN); Yingming Liu, Beijing (CN); Lei Wang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 189 days.

(21) Appl. No.: 15/122,691

(22) PCT Filed: Oct. 23, 2015

(86) PCT No.: PCT/CN2015/092683
§ 371 (c)(1),
(2) Date: Aug. 31, 2016

(87) PCT Pub. No.: WO2016/188027
PCT Pub. Date: Dec. 1, 2016

(65) Prior Publication Data
US 2017/0097734 A1 Apr. 6, 2017

(30) Foreign Application Priority Data
May 25, 2015 (CN) .......................... 2015 1 0272191

(51) Int. Cl.
*G06F 3/041* (2006.01)
*G06F 3/042* (2006.01)
(Continued)

(52) U.S. Cl.
CPC .......... *G06F 3/0418* (2013.01); *G02F 1/1368* (2013.01); *G02F 1/13338* (2013.01);
(Continued)

(58) Field of Classification Search
CPC ...... G06F 3/0418; G06F 3/047; G06F 3/0412; G06F 3/0421; G02F 1/134309;
(Continued)

(56) References Cited

U.S. PATENT DOCUMENTS

2007/0132374 A1* 6/2007 Park .................... H01L 27/3253
313/504
2007/0279372 A1* 12/2007 Brown Elliott ...... G09G 3/3426
345/102

(Continued)

FOREIGN PATENT DOCUMENTS

CN 101576786 A 11/2009
CN 201615292 U 10/2010
(Continued)

OTHER PUBLICATIONS

A Corrected Chinese Search Report from the Chinese Patent Office dated Sep. 3, 2015; Appln. No. 201510272191.1.
(Continued)

*Primary Examiner* — Alexander Eisen
*Assistant Examiner* — Kebede T Teshome

(57) ABSTRACT

An in-cell touch display panel includes a display area. The display area includes a plurality of touch zones arranged in an array, one or more touch scanning lines corresponding to a respective row of the touch zones, and touch reading lines that have a one-to-one correspondence with the touch zones. Each of the touch zones includes at least one touch module, each touch module includes a photosensitive unit and a touch reading unit, an output end of the photosensitive unit is connected to an input end of the touch reading unit, a
(Continued)

control end of the touch reading unit is connected to a corresponding touch scanning line, and an output end of the touch reading unit is connected to a corresponding touch reading line.

20 Claims, 3 Drawing Sheets

(51) Int. Cl.
    *G02F 1/1333*     (2006.01)
    *G02F 1/1343*     (2006.01)
    *G02F 1/1368*     (2006.01)
    *G06F 3/047*     (2006.01)

(52) U.S. Cl.
    CPC ........ *G02F 1/134309* (2013.01); *G06F 3/042* (2013.01); *G06F 3/047* (2013.01); *G06F 3/0412* (2013.01); *G06F 3/0416* (2013.01); *G06F 3/0421* (2013.01); *G02F 2001/134345* (2013.01)

(58) Field of Classification Search
    CPC ............... G02F 1/1368; G02F 1/13338; G02F 2001/134345
    See application file for complete search history.

(56) References Cited

U.S. PATENT DOCUMENTS

| | | | | |
|---|---|---|---|---|
| 2009/0027350 | A1* | 1/2009 | Lee | G06F 3/0412 345/173 |
| 2011/0310072 | A1* | 12/2011 | Oyobe | G06F 3/042 345/207 |
| 2011/0310133 | A1* | 12/2011 | Koyama | G09G 3/342 345/690 |
| 2013/0270618 | A1 | 10/2013 | Fan et al. | |
| 2014/0015801 | A1* | 1/2014 | Chung | G06F 3/042 345/175 |
| 2015/0029157 | A1* | 1/2015 | Wang | G06F 3/03547 345/175 |
| 2016/0259475 | A1* | 9/2016 | Nakamura | G06F 3/0416 |

FOREIGN PATENT DOCUMENTS

| | | |
|---|---|---|
| CN | 202132613 U | 2/2012 |
| CN | 102707843 A | 10/2012 |
| CN | 103294283 A | 9/2013 |
| CN | 203258208 U | 10/2013 |
| CN | 203376707 A | 1/2014 |
| CN | 104808867 A | 7/2015 |

OTHER PUBLICATIONS

The Chinese Patent Office Search Report dated Sep. 1, 2015; Appln. No. 201510272191.1.
First Chinese Office Action dated Dec. 1, 2015; Appln. No. 20151027219.1.
Second Chinese Office Action dated May 10, 2016; Appln. No. 201510272191.1.
Third Chinese Office Action dated Sep. 26, 2016; Appln. No. 201510272191.1.
International Search Report and Written Opinion dated Feb. 6, 2016; PCT/CN2015/092683.

* cited by examiner

IN-CELL TOUCH DISPLAY PANEL AND TOUCH DISPLAY SYSTEM

TECHNICAL FIELD

Embodiments of the disclosure relate to an in-cell touch display panel and a touch display system.

BACKGROUND

With rapid development of the display technology, touch screen panels have gradually immersed into people's life. Presently, the touch screen panels are approximately classified into resistive sensing touch screen panels, capacitive sensing touch screen panels, optical sensing touch screen panels and the like according to their operating principles. Based on their formation structures, the touch screen panels are approximately classified into: out-cell touch display panels with touch screens externally hanged onto the display panels, on-cell touch display panels with touch screens being located on the display panels, and in-cell touch display panels with touch screens embedded into the display panels. The structure, in which a touch screen is embedded within a display panel, can reduce the overall thickness of the touch screen panel and also enormously decrease the fabrication cost of the touch screen panel, and therefore, it is favored by major panel manufacturers.

For the present, the design where the touch screen is embedded within the display panel is mainly achieved through manners such as resistive sensing, capacitive sensing or optical sensing. The resistive sensing manner is a low-end sensing technique, and products made by the resistive sensing manner generally have a shorter life; the capacitive sensing manner develops rapidly and is popular, but the capacitive sensing touch screen panels are mainly suitable for medium and small sized display devices, for example, products with a size of 10 inches or under 10 inches. For larger-sized display devices, the capacitive sensing touch screen panels may have problems such as signal interference and signal delay.

SUMMARY

Embodiments of the disclosure provide an in-cell touch display panel and a touch display system so as to reduce signal interference and signal delay associated with a large-sized touch screen panel.

Embodiments of the disclosure provide an in-cell touch display panel comprising a display area, the display area comprising a plurality of touch zones arranged in an array, one or more touch scanning lines corresponding to a respective row of the touch zones, and touch reading lines that have a one-to-one correspondence with the touch zones. Each of the touch zones comprises at least one touch module, each touch module comprises a photosensitive unit and a touch reading unit, an output end of the photosensitive unit is connected to an input end of the touch reading unit, a control end of the touch reading unit is connected to a corresponding touch scanning line, and an output end of the touch reading unit is connected to a corresponding touch reading line.

For example, the in-cell touch display panel provided by the embodiments of the disclosure further comprises a light source for display which is used when the display area is in display, where: the photosensitive unit generates a touch signal in response to receiving light and supplies the generated touch signal to the input end of the touch reading unit; when the touch reading unit is in a turn-on state under control of the corresponding touch scanning line, the touch reading unit outputs the touch signal to the touch reading line; and when a touch object approaches the touch display panel within a preset distance range, the touch object reflects at least part of the light from the light source for display onto the photosensitive unit, and the at least part of the light reflected onto the photosensitive unit is the light received by the photosensitive unit.

For example, in the in-cell touch display panel provided by embodiments of the disclosure, the photosensitive unit comprises a photosensitive transistor. A source electrode and a gate electrode of the photosensitive transistor are connected to each other, and a drain electrode of the photosensitive transistor is the output end of the photosensitive unit.

For example, in the in-cell touch display panel provided by embodiments of the disclosure, source electrodes and drain electrodes of all the photosensitive transistors located within a same touch zone are connected with together.

For example, in the in-cell touch display panel provided by embodiments of the disclosure, the touch reading unit comprises a switch transistor; where a source electrode of the switch transistor is the input end of the touch reading unit, a gate electrode of the switch transistor is the control end of the touch reading unit, and a drain electrode of the switch transistor is the output end of the touch reading unit.

For example, in the in-cell touch display panel provided by embodiments of the disclosure, each row of the touch zones corresponds to one touch scanning line.

For example, in the in-cell touch display panel provided by embodiments of the disclosure, each of the touch zones comprises M×N touch modules and corresponds to M touch scanning lines, wherein M is a quantity of rows, N is a quantity of columns; in a same row of touch zones, each row of the touch modules that belong to the same row of touch zones correspond to one touch scanning line.

For example, in the in-cell touch display panel provided by embodiments of the disclosure, at least one gate signal line of the touch display panel is a touch scanning line.

For example, in the in-cell touch display panel provided by embodiments of the disclosure, the in-cell touch display panel is a liquid crystal panel, the light source for display is a backlight source for the liquid crystal panel, and the light received by the photosensitive unit includes light emitted by the backlight source for the liquid crystal panel and reflected onto the photosensitive unit by a touch object.

For example, in the in-cell touch display panel provided by embodiments of the disclosure, the in-cell touch display panel is a field sequential driven liquid crystal panel.

For example, in the in-cell touch display panel provided by embodiments of the disclosure, the field sequential driven liquid crystal panel comprises a liquid crystal display panel and an organic electroluminescence backlight source; the organic electroluminescence backlight source comprises a plurality of organic electroluminescence sub-pixels arranged in arrays, and the organic electroluminescence backlight source is used to drive the sub-pixels to emit light when the liquid crystal display panel displays an image; the light received by the photosensitive unit includes light emitted by the sub-pixels of the organic electroluminescence backlight source and reflected onto the photosensitive unit by a touch object.

For example, in the in-cell touch display panel provided by embodiments of the disclosure, the in-cell touch display panel is an organic electroluminescence display panel, the light source for display includes individual sub-pixels in the organic electroluminescence display panel, the light received by the photosensitive unit includes light emitted by the individual sub-pixels of the organic electroluminescence display panel and reflected onto the photosensitive unit by a touch object.

For example, embodiments of the disclosure also provide a touch display system including the in-cell touch display panel.

For example, the touch display system provided by the embodiments of the disclosure further includes a touch object for touching the in-cell touch display panel.

For example, in the touch display system provided by embodiments of the disclosure, a surface of the touch object used to approach the in-cell touch display panel includes reflective material.

BRIEF DESCRIPTION OF THE DRAWINGS

In order to illustrate the technical solutions in the embodiments of the present disclosure or the existing arts more clearly, the drawings need to be used in the description of the embodiments or the existing arts will be briefly described in the following; it is obvious that the drawings described below are only related to some embodiments of the present disclosure, for one ordinary skilled person in the art, other drawings can be obtained according to these drawings without making other inventive work.

FIG. 2b is a structural schematic view of the touch module shown in FIG. 2a;

DETAILED DESCRIPTION

Hereafter, the technical solutions of the embodiments of the present disclosure will be described in a clearly and fully understandable way in connection with the drawings related to the embodiments of the disclosure. It is obvious that the described embodiments are just a part but not all of the embodiments of the present disclosure. Based on embodiments of the present disclosure, all other embodiments obtained by those skilled in the art without making other inventive work should be within the scope of the present disclosure.

Optical sensing touch screen panels, being a next generation of the touch-sensing technology, have no restriction on the dimensions of the screens, and products made by the same have a longer life and are relatively stable, and are able to overcome the problems such as signal interference and signal delay.

Detailed description will be given below to an optical sensing in-cell touch screen panel and display device provided by embodiments of the disclosure in connection with the drawings.

Figure 1:
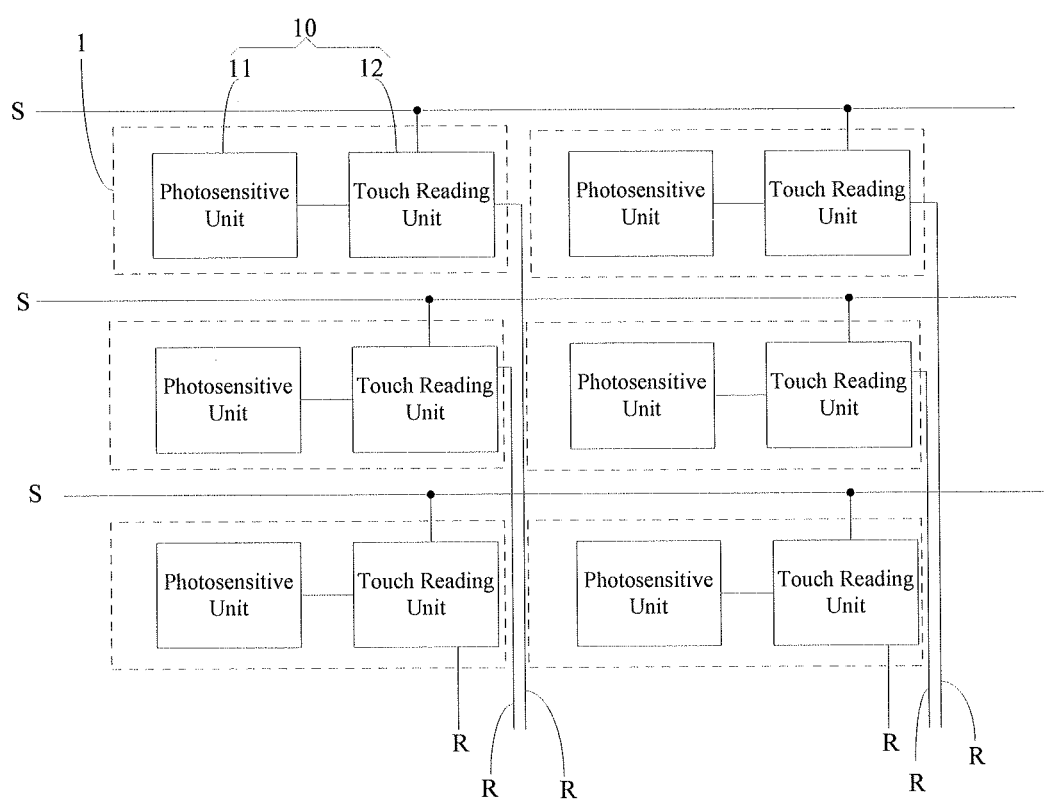
FIG. 1 is a structural schematic view of an in-cell touch display panel provided by an embodiment of the disclosure.

An in-cell touch display panel provided by embodiments of the disclosure comprises a display area and a light source for display which is used when the display area is in display. As shown in FIG. 1, the display area comprises multiple touch zones 1 arranged in an array, touch scanning lines S (Scan) corresponding to respective rows of touch zones 1, and touch reading lines R (Read) each corresponding to one touch zone 1;

Each touch zone comprises at least one touch module 10 (by way of example, a single touch module is illustrated in FIG. 1). Each touch module 10 comprises a photosensitive unit 11 and a touch reading unit 12. An output end of the photosensitive unit 11 is connected to an input end of the touch reading unit 12, a control end of the touch reading unit 12 is connected to its corresponding touch scanning line S, and an output end of the touch reading unit 12 is connected to its corresponding touch reading line R.

The operation of the touch module 10 is described as follows. The photosensitive unit 11 generates a touch signal when receiving light and provides the produced touch signal to the input end of the touch reading unit 12. When the touch reading unit 12 is in a turn-on state under the control of its corresponding touch scanning line S, the touch reading unit 12 outputs the touch signal to the touch reading line R. The light received by the photosensitive unit 11 may be light emitted from the light source for display and then reflected by a touch object onto the photosensitive unit 11 when the touch object approaches the touch display panel within a preset distance range. For example, when there is a touch object approaching the touch display panel and having a distance to the touch display panel within the preset distance range, the touch object reflects a part of the light emitted from the light source onto the photosensitive unit 11, and this part of light reflected onto the photosensitive unit 11 is the light received by the photosensitive unit 11.

The above in-cell touch display panel provided by the embodiment of the disclosure comprises a display area and a light source for display that is used when the display area is in display. The display area comprises a plurality of touch zones arranged in an array, touch scanning lines corresponding to respective rows of touch zones, and touch reading lines each corresponding to one touch zone. Each touch zone comprises at least one touch module, and each touch module comprises a photosensitive unit and a touch reading unit. The touch module is used in such a way that: the photosensitive unit generates a touch signal in response to receiving light and provides the produced touch signal to the input end of the touch reading unit; when the touch reading unit is in a turn-on state under the control of its corresponding touch scanning line, the touch reading unit outputs the touch signal to the touch reading line; the light received by the photosensitive unit may be the light emitted from the light source and then reflected by the touch object onto the photosensitive unit when this touch object approaches the touch display panel within a preset distance range. Through the determination of the magnitude of the signal in the touch reading line, it can be determined whether a touch operation exists, thereby achieving the optical sensing touch function, which will not cause problems such as signal interference and signal delay for large-sized products when compared to a capacitive sensing in-cell touch screen panel.

It is noted that, in order to effectively improve the touch accuracy, in the above-mentioned in-cell touch display panel provided by the embodiment of the disclosure, the touch object (for example, a finger or a touch pen, etc.) may directly contact with the display panel.

In the following, a detailed description will be made to the disclosure in conjunction with specific embodiments. It is noted that the embodiments are intended to better explain the disclosure, rather than limiting the disclosure.

Figure 2A:
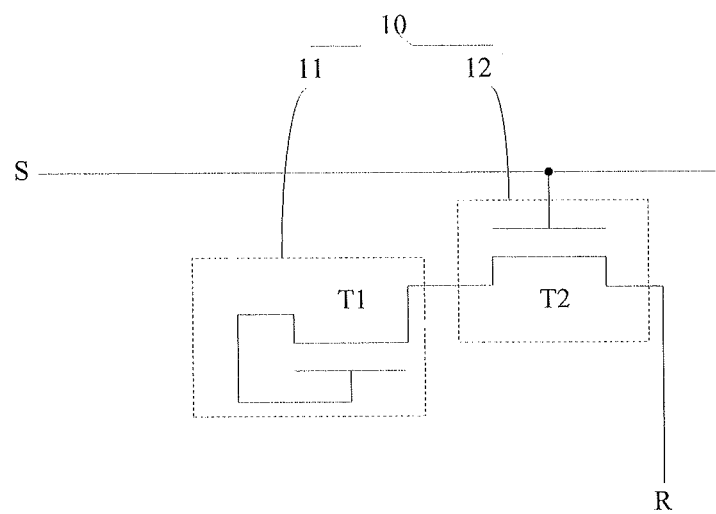
FIG. 2a is a schematic circuit diagram of one touch module provided by an embodiment of the disclosure.

For example, in the above-mentioned in-cell touch display panel provided by the embodiment of the disclosure, as shown in FIG. 2a, the photosensitive unit 11 may comprise a photosensitive transistor T1; a source electrode and a gate electrode of this photosensitive transistor T1 are connected to each other, and a drain electrode of this photosensitive transistor T1 is the output end of the photosensitive unit 11.

Figure 2B:
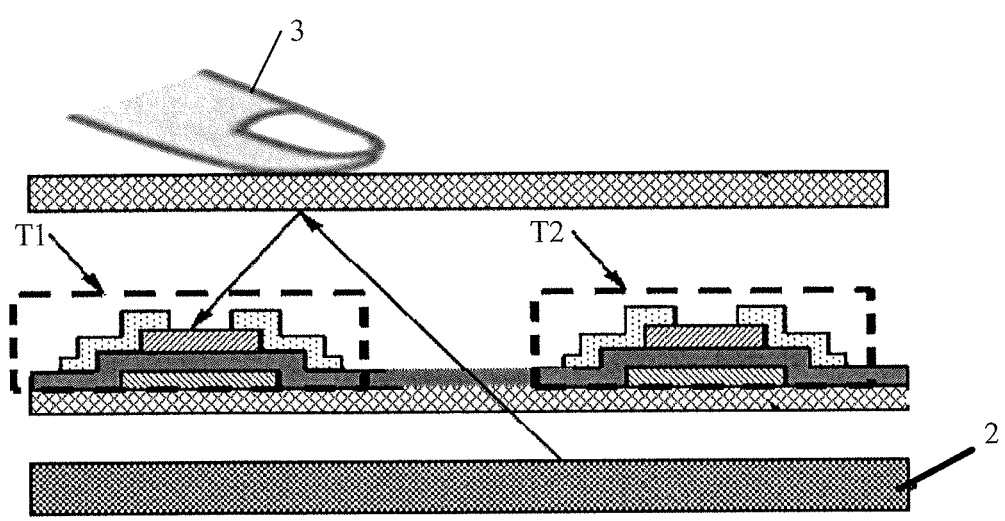

For example, as shown in FIG. 2b, the operating principle of the photosensitive transistor T1 includes: when no touch occurs, the light from the light source 2 for display exits from the touch display panel directly, there is no light irradiating on the photosensitive transistor T1, and no touch signal is outputted from the photosensitive transistor T1; when a touch object 3 approaches the touch display panel within a preset distance range, the touch object 3 reflects the light emitted from the light source 2 for display onto the photosensitive transistor T1, the photosensitive transistor T1 is subjected to an increased light intensity, a carrier density in an active layer of the photosensitive transistor T1 increases, and correspondingly the photosensitive transistor T1 outputs a touch signal to the touch reading unit 12 (for example, a switch transistor T2). Moreover, the touch signal outputted from the photosensitive transistor T1 is related to the light intensity of the light received by the photosensitive transistor T1; that is, a stronger light intensity leads to a greater touch signal outputted from the photosensitive transistor T1 to the touch reading unit 12. While the light intensity varies as a function of the distance of the touch object to the touch display panel, a smaller distance leads to a stronger light intensity and more sensitive touch detection.

It is noted that when an area touched by the touch object spans across a plurality of touch zones, signals on individual touch reading lines that correspond to the respective touch zones can be compared with each other, and a touch zone having a maximal signal can be identified as a zone touched by the touch object.

Moreover, in the above in-cell touch display panel provided by the embodiment of the disclosure, due to the fact that each of the touch zones is provided with a touch reading line with a one-to-one correspondence, the above in-cell touch display panel provided by the embodiment of the disclosure can achieve a multiple-point touch.

Figure 3:
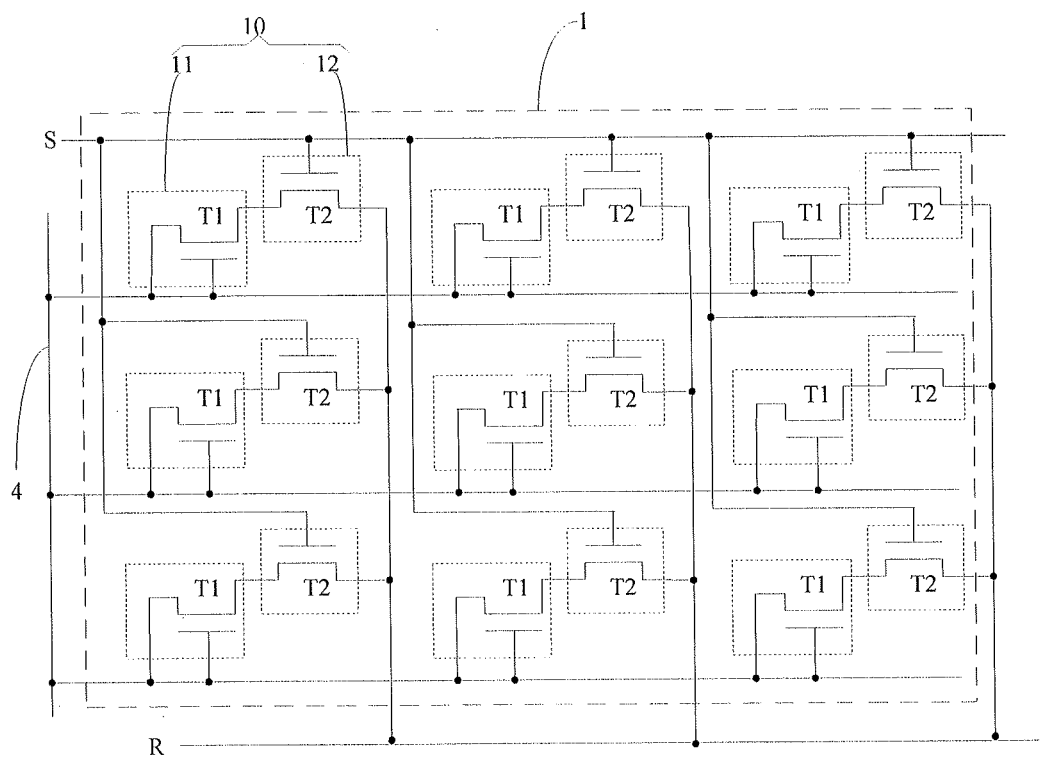
FIG. 3 is a first structural schematic view of one touch zone provided by an embodiment of the disclosure.
Figure 4:
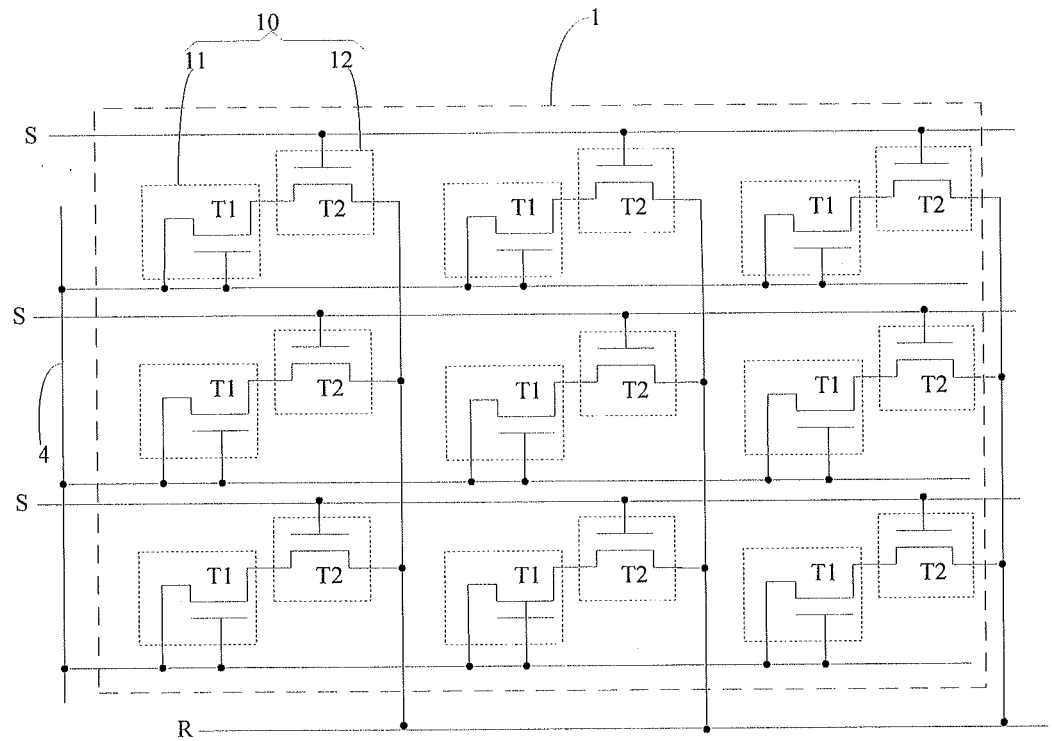
FIG. 4 is a second structural schematic view of one touch zone provided by an embodiment of the disclosure.

For example, in the above in-cell touch display panel provided by the embodiment of the disclosure, as shown in FIGS. 3 and 4, all photosensitive transistors T1 located within the same touch zone 1 have their source electrodes and gate electrodes connected together. In this way, it is possible to ensure that, when no touch occurs, all the photosensitive transistors T1 located in the same touch zone 1 have an identical state; and so, it is possible to reduce interference caused by voltage inconsistency between the source electrode and gate electrode of each photosensitive transistor T1.

Furthermore, for example, in the above touch display panel provided by the embodiment of the disclosure, as shown in FIGS. 3 and 4, each of the touch zones 1 may be provided with the signal line 4 so as to connect the gate electrodes and source electrodes of all the photosensitive transistors T1 together within the same touch zone 1. For example, such a signal line 4 may or may not be applied with signals, and no restriction is made herein in this respect.

For example, in the above in-cell touch display panel provided by the embodiment of the disclosure, as shown in FIG. 2a, the touch reading unit 12 may comprise a switch transistor T2; where the source electrode of the switch transistor T2 is the input end of the touch reading unit 12, the gate electrode of the switch transistor T2 is the control end of the touch reading unit 12, and the drain electrode of the switch transistor T2 is the output end of the touch reading unit 12. For example, when the switch transistor T2 is in a turn-on state under the control of its corresponding touch scanning line, the switch transistor T2 provides the touch signal outputted from the photosensitive unit 11 to the touch reading line, thus achieving the optical touch function.

For example, each part of the switch transistor of the touch reading unit may be made in the same layer together with the switch transistors of the pixel units in the touch display panel. In this way, no additional fabrication technology is required, but only a pattern for each corresponding film needs to be modified so as to produce such components, and thus, the manufacturing cost is reduced while improving the production efficiency. Of course, the touch reading unit may also have other configurations in practice, and similar description is not repeated here.

For example, in the above in-cell touch display panel provided by the embodiment of the disclosure, each row of the touch zones 1 may be provided with one corresponding touch scanning line S (FIG. 3 only shows a single touch zone as an example). In this way, signals on the touch scanning lines S and the touch reading lines R may be used to determine a position of each touch zone.

Alternatively, for example, in the above in-cell touch display panel provided by the embodiment of the disclosure, as shown in FIG. 4, each touch zone 1 comprises M×N touch modules 10; where M is the number of rows, and N is the number of columns. FIG. 4 shows one touch zone as an example with M=3, N=3;

In FIG. 4, each row of touch modules 10 that belong to the same row of touch zones 1 corresponds to one touch scanning line S; that is, each row of touch zones corresponds to M touch scanning lines, and thus the touch accuracy can be improved.

For example, in the above in-cell touch display panel provided by the embodiment of the disclosure, the touch reading lines may be provided between adjacent columns of pixel units in the touch display panel. Furthermore, the touch reading lines and the data signal lines of the touch display panel may be provided in the same layer and insulated from each other; that is, the touch reading lines may be fabricated at the same time with the data signal lines and insulated from the data signal lines. In this way, no additional fabrication process is required when fabricating the touch display panel, and only one patterning process is needed to create the patterns of the data signal lines and the touch reading lines, which could save the fabrication cost and improve the added value of the products. Of course, it is also possible to fabricate the touch reading lines and the data signal lines separately, and there's no restriction in this respect.

In a similar way, for example, in the above in-cell touch display panel provided by the embodiment of the disclosure, the touch scanning lines may be provided between adjacent rows of the pixel units of the touch display panel. Similarly and furthermore, the touch scanning lines and the gate signal lines of the touch display panel may be provided in the same layer and are insulated from each other; that is, the touch scanning lines may be fabricated at the same time with the gate signal lines in such a way that they are insulated from each other. Thus, no additional fabrication process is required when fabricating the touch display panel, but only one patterning process is needed to form the patterns for the gate signal lines and the touch scanning lines, which enables saving the fabrication cost and improving the added value of the products. Of course, it is also possible to fabricate the touch scanning lines and the gate signal lines separately, and there's no restriction in this respect.

For example, when implementing the above touch display panel provided by the embodiment of the disclosure, at least one gate signal line of the touch display panel may be used as the touch scanning line, and so, it can avoid adding new wiring in the touch display panel. Thus, it is possible to allow for a larger aperture opening ratio for the touch display panel, and moreover, the use of the gate signal lines as the touch scanning lines can also avoid incorporation of an independent drive IC chip for controlling the touch scanning lines independently, and thus the fabrication cost is reduced.

For example, the above in-cell touch display panel provided by the embodiment of the disclosure may be suitable for a liquid crystal panel, a field sequential driven liquid crystal panel or an organic electroluminescence panel or the like, and no restriction is made herein.

For example, the above in-cell touch display panel provided by the embodiment of the disclosure is a liquid crystal panel; the light of the light source for display originates from the light emitted from a backlight source of the liquid crystal panel. For example, the light source for display is the backlight source of the liquid crystal panel, and the light received by the photosensitive unit is the light emitted by the backlight source for the liquid crystal display and reflected onto the photosensitive unit by the touch object.

Alternatively, for example, the above in-cell touch display panel provided by the embodiment of the disclosure is a liquid crystal panel, and particularly, a field sequential driven liquid crystal panel.

For example, the field sequential driven liquid crystal panel comprises a liquid crystal display panel and an organic electroluminescence backlight source; the organic electroluminescence backlight source comprises a plurality of organic electroluminescence sub-pixels arranged in arrays; the organic electroluminescence backlight source is used for driving the individual sub-pixels to emit light when the liquid crystal display panel displays an image. The light of the light source for display of the in-cell touch display panel originates from the light emitted by the sub-pixels of the organic electroluminescence backlight source. For example, the light received by the photosensitive unit is the light emitted by the sub-pixels of the organic electroluminescence backlight source and reflected by the touch object onto the photosensitive unit.

It is noted that, in the above field sequential driven liquid crystal panel provided by the embodiment of the disclosure, the organic electroluminescence backlight source may comprise various sub-pixels of different luminous colors. In a case that the organic electroluminescence backlight source comprises three kinds of sub-pixels, i.e., the sub-pixels of R, G, B luminous colors, the operating principle for the organic electroluminescence backlight source may include dividing the display of one image frame into three phases: in a first phase, the sub-pixels of one luminous color is driven to emit light, for example, the R sub-pixels; in a second phase, the sub-pixels of another luminous color are driven to emit light, for example, the G sub-pixels; in a third phase, the sub-pixels of a remaining luminous color are driven to emit light, for example, the B sub-pixels. The organic electroluminescence backlight source of the liquid crystal display panel keeps synchronous cooperation when in display to achieve a normal display; and no color filters are provided in the liquid crystal display panel. The specific implementations of the field sequential driven liquid crystal panel are identical to existing field sequential driven liquid crystal panels, and similar description is not repeated here.

Alternatively, for example, the above in-cell touch display panel provided by the embodiment of the disclosure is an organic electroluminescence display panel, and the light of the light source for display is the light emitted by individual sub-pixels of the organic electroluminescence display panel. For example, the light received by the photosensitive unit is the light emitted by individual sub-pixels of the organic electroluminescence display panel and reflected by the touch object onto the photosensitive unit.

Base on an identical inventive concept, the embodiments of the disclosure also provide a touch display system comprising any one of the above in-cell touch display panels provided by the embodiments of the disclosure. Furthermore, the touch display system further comprises a touch object used for touching the in-cell touch display panel, for example, a touch pen or another object for touching the panel. The implementation of such a touch display system may be achieved with reference to the above embodiments of the in-cell touch display panel; and repeated description is omitted here.

For example, in order to produce a greater touch signal by the photosensitive unit when the touch object touches the in-cell touch display panel, the intensity of the light incident onto the photosensitive unit needs to be enhanced; and therefore, in the above touch display system provided by the embodiments of the disclosure, a surface of the touch object that approaches the in-cell touch display panel can include high reflective materials. For example, such a high reflective material may be metal and the like, and there is no restriction in this respect.

The above in-cell touch display panel and touch display system provided by the embodiments of the disclosure comprise a display area and a light source for display that is used when the display area is in display; the display area comprises a plurality of touch zones arranged in an array, touch scanning lines corresponding to respective rows of the touch zones, and touch reading lines each corresponding to one touch zone; each touch zone comprises at least one touch module, and each touch module comprises a photosensitive unit and a touch reading unit. The touch module is used in such a way that: the photosensitive unit generates a touch signal when receiving light and provides the produced touch signal to the input end of the touch reading unit; when the touch reading unit is in a turn-on state under the control of its corresponding touch scanning line, the touch reading unit outputs the touch signal to the touch reading line. The light received by the photosensitive unit may be the light emitted from the light source for display and reflected by the touch object onto the photosensitive unit when this touch object is approaching the touch display panel within a preset distance range. Through the determination of the magnitude of the signals in the touch reading lines, whether a touch exists can be determined, thereby achieving the optical sensing touch function, which will not cause problems such as signal interference and signal delay for large-sized products compared to a capacitive sensing in-cell touch screen panel.

It's to be noted that, in the drawings, for the clarity of the drawings the sizes of layers and areas may be exaggerated. And it can be understood, in the case that a component or a layer called "on" another element or layer, it can be directly on the top of the other elements, or can exist in the middle layer. Besides, it can be understood that, in the case that a component or a layer called "under" another element or layer, it can be directly under the other components, or there are at least two intermediate layers or elements. Besides, it can also be understood that, in the case that a layer or a component called "between" two layers or two elements, it can be the only layer of the two layers or two components, or it also exists at least two intermediate layers or elements. The similar reference marks indicate similar components in the whole text.

In the present disclosure, terms such as "first", "second" and the like used in the present disclosure do not indicate any sequence, quantity or significance but only for distinguishing different constituent parts. Also, the terms such as "a," "an," or "the" etc., are not intended to limit the amount, but indicate the existence of at lease one. The terms "comprises," "comprising," "includes," "including," etc., are intended to specify that the elements or the objects stated before these terms encompass the elements or the objects and equivalents thereof listed after these terms, but do not preclude the other elements or objects.

It is noted that, azimuth or positional relationships indicated by terms such as "up" and "down" and so on, are azimuth or positional relationships based on the drawings, which are only to facilitate description of the embodiments of the present disclosure and simplify the description, but not to indicate or imply that the devices or components must have a specific azimuth, or be constructed or operated in the specific azimuth, which thus cannot be understood as a limitation to the embodiments of the present disclosure. Unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. Those skilled in the art can understand the specific meanings of the above-mentioned terms in the embodiments of the present disclosure according to the specific circumstances.

Obviously, those skilled in the art may modify the disclosure in various ways without breaking away from the spirits and scope of the disclosure. And so, if these changes and variations of the disclosure also fall within the scope of the claims or their equivalent technologies, the disclosure intends to include these changes and variations.

What are described above is related to the illustrative embodiments of the disclosure only and not limitative to the scope of the disclosure; any changes or replacements easily for those technical personnel who are familiar with this technology in the field to envisage in the scopes of the disclosure, should be in the scope of protection of the present disclosure. Therefore, the scopes of the disclosure are defined by the accompanying claims.

The present application claims the priority of the Chinese Patent Application No. 201510272191.1 filed on May 25, 2015, which is incorporated herein by reference in its entirety as part of the disclosure of the present application.

What is claimed is:

1. An in-cell touch display panel comprising a display area, the display area comprising a plurality of touch zones arranged in an array of a plurality of rows and a plurality of columns, one or more touch scanning lines corresponding to a respective row of the touch zones, and touch reading lines that have a one-to-one correspondence with the touch zones; wherein:
   touch zones located in a same column are in one-to-one correspondence with different touch reading lines,
   each of the touch zones comprises M×N touch modules, wherein M is a quantity of rows, M≥2, N is a quantity of columns, N≥2, each touch module comprises a photosensitive unit and a touch reading unit, an output end of the photosensitive unit is connected to an input end of the touch reading unit, a control end of the touch reading unit is connected to a corresponding touch scanning line, and an output end of the touch reading unit is connected to a corresponding touch reading line; and
   output ends of touch reading units of the M×N touch modules in each of the touch zones are all connected with a same corresponding touch reading line.

2. The in-cell touch display panel according to claim 1, further comprising a light source for display which is used when the display area is in display, wherein:
   the photosensitive unit generates a touch signal in response to receiving light and supplies the generated touch signal to the input end of the touch reading unit; when the touch reading unit is in a turn-on state under control of the corresponding touch scanning line, the touch reading unit outputs the touch signal to the touch reading line; and
   when a touch object approaches the touch display panel within a preset distance range, the touch object reflects at least part of light from the light source for display onto the photosensitive unit, and the at least part of light reflected onto the photosensitive unit is the light received by the photosensitive unit.

3. The in-cell touch display panel according to claim 1, wherein the photosensitive unit comprises a photosensitive transistor, the touch reading unit comprises a switch transistor;
   a source electrode and a gate electrode of the photosensitive transistor are connected to each other, and a drain electrode of the photosensitive transistor is the output end of the photosensitive unit; and
   a source electrode of the switch transistor is the input end of the touch reading unit, a gate electrode of the switch transistor is the control end of the touch reading unit, and a drain electrode of the switch transistor is the output end of the touch reading unit.

4. The in-cell touch display panel according to claim 3, wherein source electrodes and gate electrodes of all the photosensitive transistors located within a same touch zone are connected with together.

5. The in-cell touch display panel according to claim 1, wherein each row of the touch zones corresponds to one touch scanning line.

6. The in-cell touch display panel according to claim 1, wherein each of the touch zones corresponds to M touch scanning lines;
   in a same row of touch zones, each row of the touch modules that belong to the same row of touch zones correspond to one touch scanning line, at least one gate signal line of the touch display panel is a touch scanning line.

7. The in-cell touch display panel according to claim 2, wherein the in-cell touch display panel is a liquid crystal panel, the light source for display is a backlight source for the liquid crystal panel, and the light received by the photosensitive unit includes light emitted by the backlight source for the liquid crystal panel and reflected onto the photosensitive unit by the touch object; or
   the in-cell touch display panel is an organic electroluminescence display panel, the light source for display includes individual sub-pixels in the organic electroluminescence display panel, the light received by the photosensitive unit includes light emitted by the individual sub-pixels of the organic electroluminescence display panel and reflected onto the photosensitive unit by a touch object.

8. The in-cell touch display panel according to claim 1, wherein the in-cell touch display panel is a field sequential driven liquid crystal panel;

the field sequential driven liquid crystal panel comprises a liquid crystal display panel and an organic electroluminescence backlight source; the organic electroluminescence backlight source comprises a plurality of organic electroluminescence sub-pixels arranged in arrays, and the organic electroluminescence backlight source is used to drive the sub-pixels to emit light when the liquid crystal display panel displays an image;

the light received by the photosensitive unit includes light emitted by the sub-pixels of the organic electroluminescence backlight source and reflected onto the photosensitive unit by a touch object.

9. A touch display system comprising the in-cell touch display panel according to claim 1.

10. The touch display system according to claim 9, further comprising a touch object for touching the in-cell touch display panel, a surface of the touch object used to approach the in-cell touch display panel includes reflective material.

11. The in-cell touch display panel according to claim 2, wherein the photosensitive unit comprises a photosensitive transistor, the touch reading unit comprises a switch transistor;

a source electrode and a gate electrode of the photosensitive transistor are connected to each other, and a drain electrode of the photosensitive transistor is the output end of the photosensitive unit; and a source electrode of the switch transistor is the input end of the touch reading unit, a gate electrode of the switch transistor is the control end of the touch reading unit, and a drain electrode of the switch transistor is the output end of the touch reading unit.

12. The in-cell touch display panel according to claim 2, wherein each row of the touch zones corresponds to one touch scanning line.

13. The in-cell touch display panel according to claim 2, wherein each of the touch zones corresponds to M touch scanning lines;

in a same row of touch zones, each row of the touch modules that belong to the same row of touch zones correspond to one touch scanning line.

14. An in-cell touch display panel comprising a display area, the display area comprising a plurality of touch zones arranged in an array, one or more touch scanning lines corresponding to a respective row of the touch zones, and touch reading lines that have a one-to-one correspondence with the touch zones; wherein:

each of the touch zones comprises M×N touch modules, wherein M is a quantity of rows, M≥2, N is a quantity of columns, N≥2, each touch module comprises a photosensitive unit and a touch reading unit, an output end of the photosensitive unit is connected to an input end of the touch reading unit, a control end of the touch reading unit is connected to a corresponding touch scanning line, and an output end of the touch reading unit is connected to a corresponding touch reading line; and output ends of touch reading units of the M×N touch modules in each of the touch zones are all connected with a same corresponding touch reading line;

wherein the photosensitive unit comprises a photosensitive transistor;

a source electrode and a gate electrode of the photosensitive transistor are connected to each other, and a drain electrode of the photosensitive transistor is the output end of the photosensitive unit, source electrodes and gate electrodes of all photosensitive transistors in M×N touch modules located within a same touch zone are connected with together.

15. The in-cell touch display panel according to claim 14, further comprising a light source for display which is used when the display area is in display, wherein:

the photosensitive unit generates a touch signal in response to receiving light and supplies the touch signal generated to the input end of the touch reading unit; when the touch reading unit is in a turn-on state under control of the corresponding touch scanning line, the touch reading unit outputs the touch signal to the touch reading line; and when a touch object approaches the touch display panel within a preset distance range, the touch object reflects at least part of light from the light source for display onto the photosensitive unit, and the at least part of light reflected onto the photosensitive unit is the light received by the photosensitive unit.

16. The in-cell touch display panel according to claim 14, wherein the touch reading unit comprises a switch transistor;

wherein a source electrode of the switch transistor is the input end of the touch reading unit, a gate electrode of the switch transistor is the control end of the touch reading unit, and a drain electrode of the switch transistor is the output end of the touch reading unit.

17. The in-cell touch display panel according to claim 14, wherein each row of the touch zones corresponds to one touch scanning line.

18. The in-cell touch display panel according to claim 14, wherein each of the touch zones corresponds to M touch scanning lines;

in a same row of touch zones, each row of the touch modules that belong to the same row of touch zones correspond to one touch scanning line, at least one gate signal line of the touch display panel is a touch scanning line.

19. The in-cell touch display panel according to claim 15, wherein the in-cell touch display panel is a liquid crystal panel, the light source for display is a backlight source for the liquid crystal panel, and the light received by the photosensitive unit includes light emitted by the backlight source for the liquid crystal panel and reflected onto the photosensitive unit by the touch object; or the in-cell touch display panel is an organic electroluminescence display panel, the light source for display includes individual sub-pixels in the organic electroluminescence display panel, the light received by the photosensitive unit includes light emitted by the individual sub-pixels of the organic electroluminescence display panel and reflected onto the photosensitive unit by the touch object.

20. The in-cell touch display panel according to claim 14, wherein the in-cell touch display panel is a field sequential driven liquid crystal panel, the field sequential driven liquid crystal panel comprises a liquid crystal display panel and an organic electroluminescence backlight source; the organic electroluminescence backlight source comprises a plurality of organic electroluminescence sub-pixels arranged in arrays, and the organic electroluminescence backlight source is used to drive the sub-pixels to emit light when the liquid crystal display panel displays an image;

the light received by the photosensitive unit includes light emitted by the sub-pixels of the organic electroluminescence backlight source and reflected onto the photosensitive unit by a touch object.

* * * * *